United States Patent
Ritika et al.

(10) Patent No.: US 12,124,413 B2
(45) Date of Patent: Oct. 22, 2024

(54) READ AMPLIFICATION REDUCTION IN A VIRTUAL STORAGE SYSTEM WHEN COMPRESSION IS ENABLED FOR A ZONED CHECKSUM SCHEME

(71) Applicant: NetApp, Inc., San Jose, CA (US)

(72) Inventors: Ritika, Uttar Pradesh (IN); Jagadish Vasudeva, Bangalore (IN); Vani Vully, Bangalore (IN); Raj Kamal, Bangalore (IN); Deepak Dangi, Bangaluru (IN); Parag Deshmukh, Bangalore (IN)

(73) Assignee: NetApp, Inc., San Jose, CA (US)

( * ) Notice: Subject to any disclaimer, the term of this patent is extended or adjusted under 35 U.S.C. 154(b) by 93 days.

(21) Appl. No.: 17/708,284

(22) Filed: Mar. 30, 2022

(65) Prior Publication Data
US 2023/0315691 A1 Oct. 5, 2023

(51) Int. Cl.
*G06F 16/174* (2019.01)
*G06F 3/06* (2006.01)

(52) U.S. Cl.
CPC ........ *G06F 16/1744* (2019.01); *G06F 3/0613* (2013.01); *G06F 3/064* (2013.01); *G06F 3/0665* (2013.01); *G06F 3/0689* (2013.01)

(58) Field of Classification Search
CPC .... G06F 16/1744; G06F 3/0613; G06F 3/064; G06F 3/0665; G06F 3/0689
See application file for complete search history.

(56) References Cited

U.S. PATENT DOCUMENTS

| | | | | |
|---|---|---|---|---|
| 6,637,007 B1* | 10/2003 | Bots | ................... | H03M 13/096 |
| | | | | 714/807 |
| 6,836,832 B1* | 12/2004 | Klinkner | ................ | G06F 3/067 |
| | | | | 711/170 |
| 7,096,415 B1* | 8/2006 | Bots | ................... | H03M 13/096 |
| | | | | 714/807 |
| 7,496,586 B1* | 2/2009 | Bonwick | ................ | H03M 7/30 |
| 7,653,712 B1* | 1/2010 | Dubrovsky | ......... | H04L 41/0853 |
| | | | | 709/224 |
| 8,327,187 B1* | 12/2012 | Metcalf | ................ | H04L 49/109 |
| | | | | 714/10 |
| 8,516,343 B2* | 8/2013 | Flynn | ................... | G11C 29/88 |
| | | | | 714/773 |

(Continued)

*Primary Examiner* — Anhtai V Tran
*Assistant Examiner* — Huen Wong
(74) *Attorney, Agent, or Firm* — Jaffery Watson Hamilton & DeSanctis LLP

(57) ABSTRACT

Systems and methods for reducing read application in a virtual storage system are provided. According to one embodiment, heuristic data may be tracked and utilized in real-time by a file system of the virtual storage system at the level of granularity of a volume, thereby allowing a fast path flag to be enabled/disabled at a volume level during various phases of operation of a workload. The heuristic data for a given volume may be indicative of a correlation between (i) data blocks stored on the given volume being located within a compressible zone of a zoned checksum scheme and (ii) the respective data blocks containing compressed data and a corresponding checksum. Based on the heuristic data, read requests may be selectively directed to the read path (e.g., a fast path or a slow path) expected to mitigate read amplification when data compression is enabled for a zoned checksum scheme.

20 Claims, 6 Drawing Sheets

(56) References Cited

U.S. PATENT DOCUMENTS

| | | | | |
|---|---|---|---|---|
| 8,639,658 | B1* | 1/2014 | Kumaresan | G06F 3/0689 |
| | | | | 707/609 |
| 8,943,032 | B1* | 1/2015 | Xu | G06F 16/119 |
| | | | | 707/661 |
| 9,063,664 | B1* | 6/2015 | Li | G06F 3/0641 |
| 9,087,086 | B1* | 7/2015 | Li | G06F 16/1748 |
| 9,104,342 | B2* | 8/2015 | Bourbonnais | G06F 11/1076 |
| 9,367,394 | B2* | 6/2016 | Storer | G06F 11/1004 |
| 10,102,057 | B2* | 10/2018 | Karamanolis | G06F 3/0664 |
| 11,093,442 | B1* | 8/2021 | Bhutani | G06F 16/119 |
| 11,861,172 | B2* | 1/2024 | Bhattacharjee | G06F 3/0608 |
| 2017/0185296 | A1* | 6/2017 | Dong | G06F 3/0629 |
| 2017/0309343 | A1* | 10/2017 | Lim | G06F 12/1009 |
| 2019/0004803 | A1* | 1/2019 | Al Sheikh | G06F 9/3806 |
| 2019/0087126 | A1* | 3/2019 | Chun | G06F 3/0611 |
| 2020/0210586 | A1* | 7/2020 | Cariello | G11C 16/26 |
| 2020/0293196 | A1* | 9/2020 | Tamma | G06F 11/1004 |
| 2020/0341915 | A1* | 10/2020 | LeCrone | G06F 3/0686 |
| 2021/0406174 | A1* | 12/2021 | Gole | G06F 12/0246 |
| 2021/0409316 | A1* | 12/2021 | Seshan | H04L 41/16 |
| 2022/0308783 | A1* | 9/2022 | Chinthekindi | G06F 3/0649 |
| 2022/0398221 | A1* | 12/2022 | Zou | G06F 16/164 |
| 2023/0315315 | A1* | 10/2023 | Ritika | G06F 3/0619 |
| | | | | 711/154 |
| 2023/0325098 | A1* | 10/2023 | Taylor | G06F 3/0673 |
| | | | | 711/154 |

* cited by examiner

READ AMPLIFICATION REDUCTION IN A VIRTUAL STORAGE SYSTEM WHEN COMPRESSION IS ENABLED FOR A ZONED CHECKSUM SCHEME

BACKGROUND

Field

Various embodiments of the present disclosure generally relate to data storage systems. In particular, some embodiments relate to an approach for reducing read operation amplification by a virtual storage system during read scenarios in which non-compressible data is stored within a compressible zone of a zoned checksum scheme (e.g., advanced zoned checksum (AZCS)).

Description of the Related Art

Depending upon the size of blocks and the particular checksum scheme (e.g., block checksum (BCS) or a zoned checksum scheme, such as advanced zoned checksum (AZCS)) employed by a storage system, a drive utilized by the storage system may be formatted with a differing number of bytes per sector. For example, assuming the use of 4 KB blocks and BCS, the drives utilized by a storage system may be formatted with 520 bytes per sector in which data is stored in 512 bytes and a corresponding checksum is stored in the remaining 8 bytes. Assuming the same block size, when the storage system makes use of AZCS, however, the drives may be formatted with 512 bytes per sector and divided into zones of 64 blocks (which may be referred to individually as an AZCS zone and collectively as AZCS zones) in which 63 of the 64 blocks store data and the remaining block (which may be referred to as a checksum block) of the 64 blocks stores the respective checksums for the other 63 blocks in the zone. As such, when a storage system uses AZCS, each read request (e.g., a single input/output (I/O) operation) by a client of the storage system has a potential of being amplified into at least two read operations by an intermediate storage layer logically interposed between a file system layer of the storage system and the underlying data storage media—one to read the data block within the AZCS zone at issue and another to read the checksum block within the AZCS zone at issue.

SUMMARY

Systems and methods are described for reducing read application in a virtual storage system. According to one embodiment, a file system of the virtual storage system maintains volume-level heuristic data for a volume of the virtual storage system indicative of a correlation between (i) data blocks stored on the volume of the virtual storage system being located within a compressible zone of a zoned checksum scheme and (ii) the respective data blocks containing compressed data and a corresponding checksum. Based on the heuristic data, a read request received by the file system from a workload to which the volume has been assigned for use and associated with a data block of the data blocks is selectively directed by the file system to a fast path via a storage layer of the virtual storage system or a slow path via a data virtualization layer of the virtual storage system.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
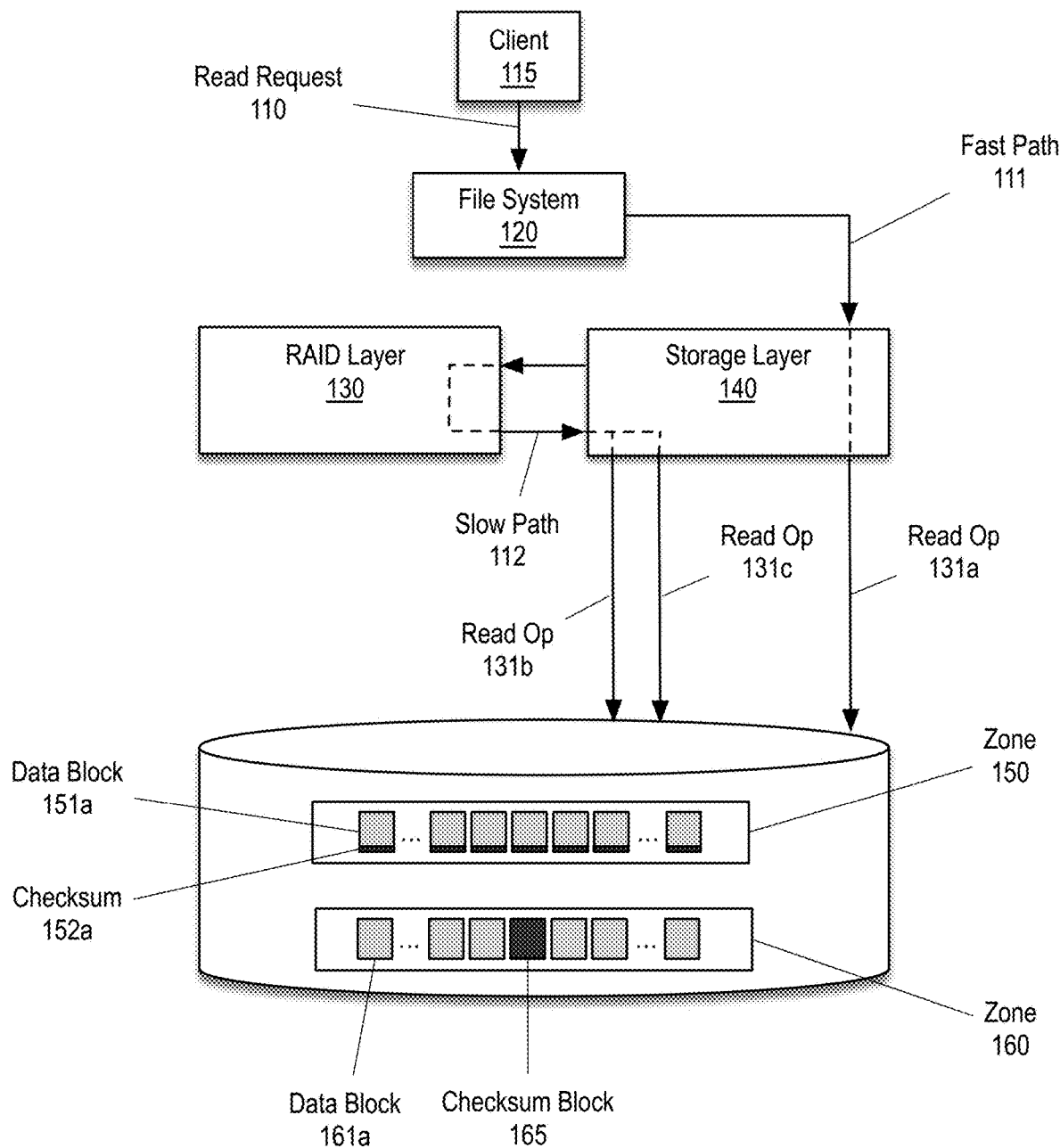
FIG. 1 is a block diagram conceptually illustrating the potential for 3× read amplification when AZCS compression is enabled and when data associated with a read request is not stored in compressed form, thereby resulting in restarting of a read via a slow path.

Systems and methods are described for reducing read application in a virtual storage system. As noted above, the use of a zoned checksum scheme (e.g., AZCS) by a storage system may cause a single I/O operation (e.g., a read request) issued by a client of a storage system to be amplified into two read operations as a result of the data and corresponding checksum being stored in separate blocks within a zone (e.g., an AZCS zone) of multiple zones of the zoned checksum scheme. This read amplification problem may be worse if compression is being used on the zone at issue, for example, when a compression feature (e.g., an AZCS compression feature) is enabled by the storage system for one or more volumes. As described further below with reference to FIG. 1, when the data within a data block is compressed, there is plenty of room for storage of the checksum data within the data block, so in such scenarios only one read operation may be used to retrieve both the compressed data and the corresponding checksum; however, despite the compression feature being enabled, there are write path scenarios in which data being persisted to disk may not actually be compressed. As those skilled in the art will appreciate, many data types are not compressible, because the repeating patterns that facilitate compressibility have already been removed from the data or such repeating patterns are simply not present in the data type at issue. Such non-compressible data types include most images, videos, music, data that is already compressed, and data that has been encrypted. Therefore, although the compression feature may be enabled, whether the data within a particular data block is actually stored in compressed form may not be known until after the read of the particular data block has been performed. When it is determined by the read path that the data is not compressed, the read processing may be restarted through a legacy read path (e.g., a slow path read) that is operable to handle zones (e.g., AZCS zones) storing data blocks and separate checksum blocks. The slow path read may involve sending the read to a data storage virtualization layer (e.g., a redundant array of independent disks (RAID) layer), which then performs the data and checksum reads. In the foregoing example, a single read request results in a 3× amplification. Such read application is undesirable in a cloud environment because of (i) the delays used for the additional reads, which increases the latency of completing client read requests and (ii) the added number of I/O operations, as cloud environments bill by the number of I/O operations performed and the additional reads also count against a limited number of disk I/O operations per second (IOPS) that may be available to a virtual machine (VM) hosting the storage system (e.g., a virtual storage system).

As described further below, embodiments described herein seek to mitigate read amplification when AZCS compression is being utilized by a virtual storage system by avoiding restarting of the read process via the slow path when the data associated with the read request is not stored in compressed form and/or by tracking and making use of heuristics to in effect predict the odds of the data being stored in compressed form and thereby including the corresponding checksum. According to one embodiment, a file system of the virtual storage system maintains volume-level heuristic data for a volume of the virtual storage system indicative of a correlation between (i) data blocks stored on the volume of the virtual storage system being located within a compressible zone of a zoned checksum scheme and (ii) the respective data blocks containing compressed data and a corresponding checksum. For example, the volume-level heuristic data may include a read counter, a success counter, a success rate, and a fast path enabled flag. The read counter may be indicative of a total number of read requests received by the file system involving data blocks of the compressible zone during an active window of read requests. The success counter may be indicative of a subset of the total number of read requests for which the correlation was successfully predicted. The success rate may be calculated based on the read counter and the success counter. The fast path enabled flag set based on the success rate satisfying a success rate threshold.

In one embodiment, based on (i) a determination regarding whether a data block associated with a read request received by the file system from a workload is stored within a compressible zone of multiple zones of a zoned checksum scheme of a volume assigned to the workload and in which it is permissible to store both compressed data and a corresponding checksum within a given data block and (ii) the heuristic data, the read request may be selectively directed by the file system to a fast path via a storage layer of the virtual storage system or a slow path via a data virtualization layer of the virtual storage system. When the volume-level heuristic data accurately predicts the inclusion of both data and the checksum within the data block by virtue of the data block being within the compressible zone, then the storage layer may perform a single read operation to retrieve the data and the corresponding checksum for the read request. Meanwhile, even when the volume-level heuristic data does not accurately predict the inclusion of both data and the checksum within the data block by virtue of the data block being within the compressible zone, a second fast path read operation (which may be referred to herein as a "retry") may be performed by the storage layer to read the checksum corresponding to the data of the data block, thereby satisfying the read request with two fast path reads. In either case, a reduction in read amplification may be achieved as compared to the potential for 3× amplification.

While various examples are described with reference to AZCS as an example of a zoned checksum scheme, the methodologies described herein are equally applicable to other current and future zoned checksum schemes.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein a "cloud" or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction."

P. Mell, T. Grance, The NIST Definition of Cloud Computing, National Institute of Standards and Technology, USA, 2011. The infrastructure of a cloud may cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability (e.g., cloud bursting for load balancing between clouds).

As used herein a "fast path read" or a "fast path read operation" generally refers to a read operation that avoids use of a data storage virtualization layer (e.g., a RAID layer) of a virtual storage system for retrieval of data and/or an associated checksum of the data associated with a client read request.

A "volume" generally refers to an identifiable unit of data storage. For example, a volume may represent a single accessible storage area with a single file system. In various embodiments described herein, storage is assigned to individual clients or workloads at the granularity of a volume. A volume may be a physical volume or a logical volume. A physical volume may represent a storage device (e.g., an HDD or an SSD) or a partition thereof. A partition is a logical division of a logical or physical storage device (either physical or virtual). A logical volume is a logical storage device that can span multiple physical volumes. A volume may represent a logical assembly of one or more partitions that is mounted by an operating system for use as a mass storage container. A volume may reside within a single storage devices or span multiple storage devices.

As used herein a "zoned checksum scheme" generally refers to a checksum scheme in which checksums for a group of data blocks are stored within a designated data block (which may be referred to as a "checksum block") of the group of data blocks. A non-limiting example of a zoned checksum scheme is the AZCS checksum scheme.

FIG. 1 is a block diagram conceptually illustrating the potential for 3× read amplification when AZCS compression is enabled and when data associated with a read request 110 is not stored in compressed form, thereby resulting in restarting of a read via a slow path 112. A storage node (e.g., a virtual storage system/appliance) that may be part of a distributed storage system may divide a drive into a number of AZCS zones (e.g., zones 150 and 160). In the context of the present example, zone 150 is shown including multiple (e.g., 64) data blocks (e.g., data block 151a) each of which include compressed data (the portion having a gray background) and a corresponding checksum (e.g., checksum 152a), whereas zone 160 is shown including multiple (e.g., 63) data blocks and a separate checksum block (e.g., checksum block 165) that includes the checksums for all of the data blocks in zone 160.

As noted above, due to the existence of many data types that are not compressible, although an AZCS compression feature may be enabled for use by the storage node, data associated with the read request 110 issued by a client 115 may not actually be stored in compressed form. In the context of the present example, because whether the data within a particular data block (e.g., data block 151a or data block 161a) is actually stored in compressed form may not be known until after the read of the particular data block has been performed, all reads are initially attempted via a fast path (e.g., fast path 111), which proceeds as if the data is stored in compressed form by causing a first read operation (e.g., read op 131a) to be performed by a storage layer 140. Should it be determined that the data is not compressed (e.g., based on the fact that no checksum (e.g., checksum 152a) is present within the data), the read processing may be restarted through a legacy AZCS read path (e.g., a slow path 112) that is operable to handle AZCS zones (e.g., zone 160) that store data blocks (e.g., data block 161a) containing uncompressed data and separate checksum blocks (e.g., checksum block 165).

The slow path 112 may involve a RAID layer causing the storage layer 140 to perform two additional read operations (e.g., read op 131b and read op 131c) to retrieve the data and the corresponding checksum from the checksum block 165, respectively, thereby representing a 3× amplification. While the RAID layer may implement data and/or checksum caching, normal RAID caching may not be effective due to the limited size of the cache(s) and regardless, there remains a potential for 3× read amplification when both the requested data and the corresponding checksum miss the RAID cache(s).

Figure 2:
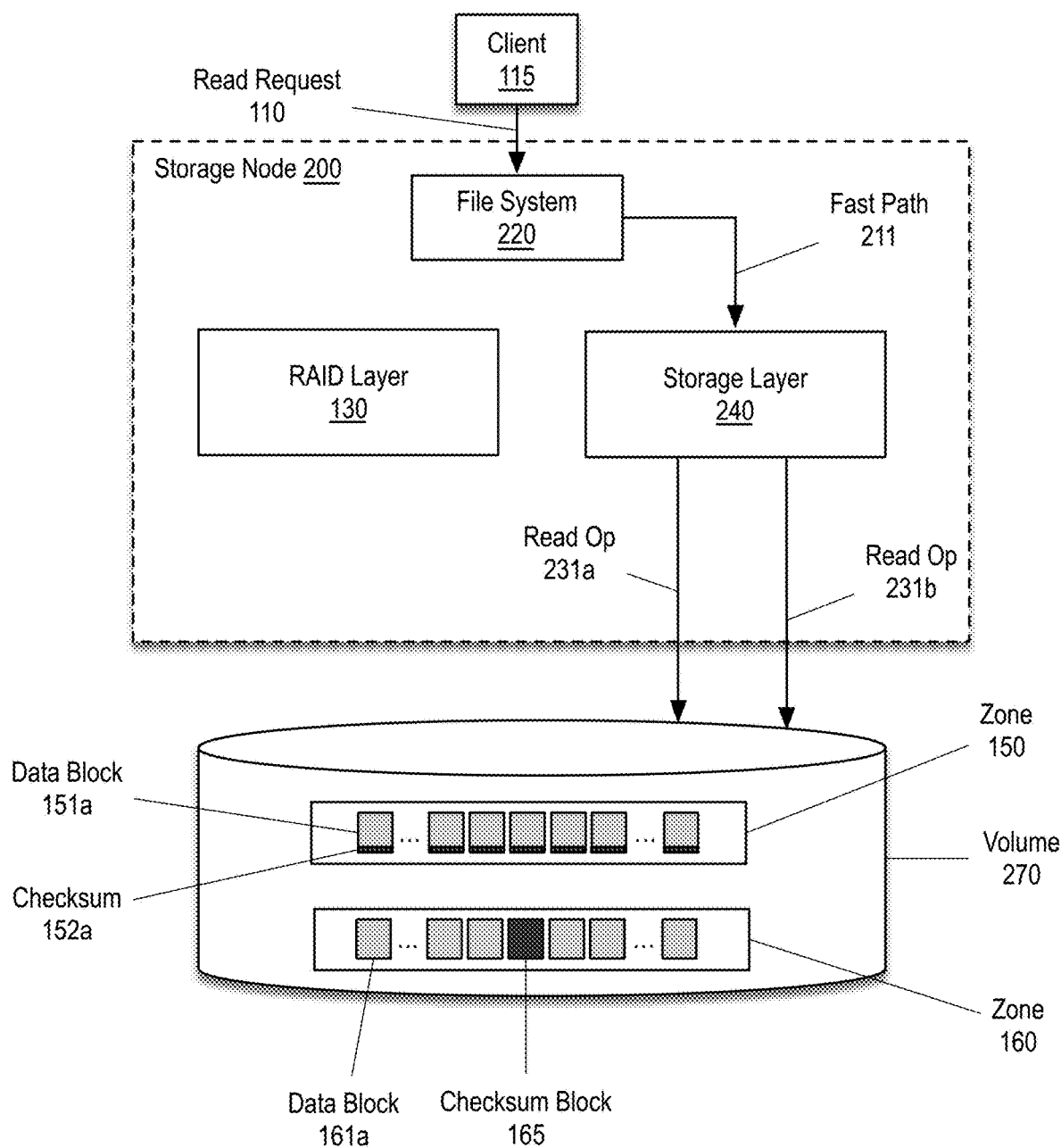
FIG. 2 is a block diagram conceptually illustrating the use of a fast path when AZCS compression is enabled and despite data associated with a read request not being stored in compressed form in accordance with an embodiment of the present disclosure.

FIG. 2 is a block diagram conceptually illustrating the use of a fast path (e.g., fast path 211) when AZCS compression is enabled and despite data associated with a read request 110 not being stored in compressed form in accordance with an embodiment of the present disclosure. In the context of the present example, a storage node (e.g., a virtual storage system/appliance) that may be part of a distributed storage system may implement modifications/improvements to file system 120 and storage layer 140 resulting in file system 220 and storage layer 240 that avoid the use of slow path 112 (except potentially for a limited number of situations as described below with reference to FIG. 3) and makes use of the fast path regardless of whether the data associated with the read request 110 is stored in compressed form. As explained further below, heuristic data and counters may be tracked and utilized at the level of granularity of a volume (e.g., volume 270) of a set of one or more volumes assigned to a particular client or workload (e.g., client 115). In this manner, a fast path flag may be enabled/disabled at a volume level during various phases of operation of a workload based on the type of data (e.g., compressible data or non-compressible data) that is being processed by the workload during a particular phase of operation. For example, a fast path flag for a window of I/O operations (e.g., an active I/O window of a configurable or predetermined number of operations) may be enabled/disabled to reflect current expected performance tradeoffs between directing the read request 110 to a slow path via the RAID layer 130 verses directing the read request to the fast path, for example, based on estimated odds of the read request 110 involving compressed data. As also explained further below, the limited number of situations in which a slow path via the RAID layer 130 may be performed may include situations in which (i) the odds (e.g., as indicated by the fast path flag) of improving the speed of read processing and reducing read amplification are too low to merit use of the fast path 211, (ii) one or more validation checks fail after completion of one or more fast path read operations (e.g., read op 231a and read op 231b); and (ii) the read request 110 is part of a read chain having a length that meets a threshold number of data blocks that can be more efficiently handled by the RAID layer 130 than by the storage layer 240.

In the context of the present example, the fast path involves performing a single read operation (e.g., read op 231a) by the storage layer 240 (i) when the data is stored in compressed form in the data block (e.g., data block 151a) and includes the corresponding checksum (e.g., checksum 152a) or (ii) when the data is not stored in compressed form in the data block (e.g., data block 161a) and the data block is proximate to (e.g., within a threshold number of blocks of) the checksum block. A second read operation (e.g., read op 231b) may be performed to read the corresponding checksum for the data when the data is not stored in compressed form in the data block (e.g., data block 151a) and the data block does not contain the corresponding checksum because it is stored in a separate checksum block (e.g., checksum block 165).

Figure 3:
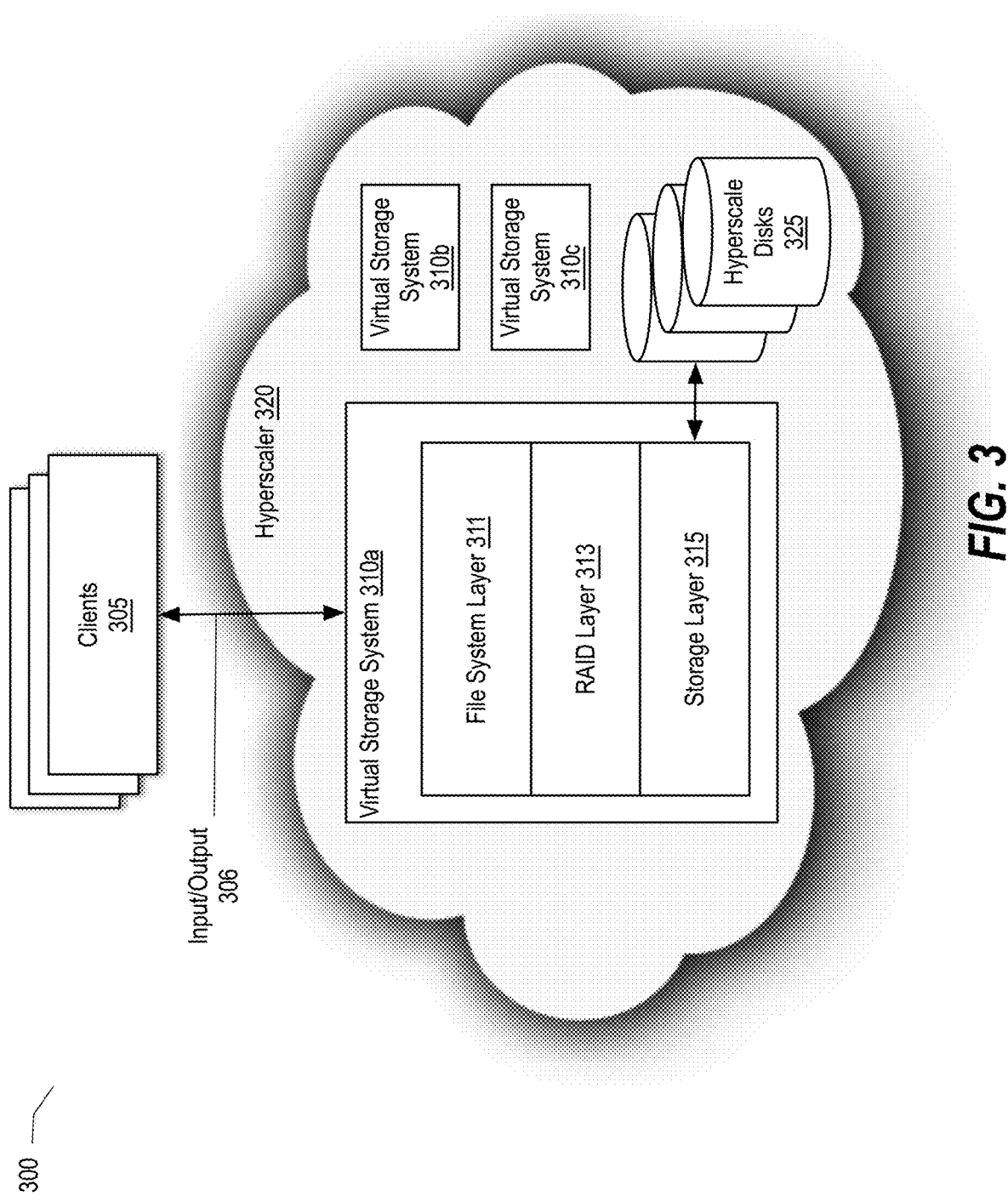
FIG. 3 is a block diagram illustrating an environment in which various embodiments may be implemented.

FIG. 3 is a block diagram illustrating a cloud environment 300 in which various embodiments may be implemented. In various examples described herein, a virtual storage system 310a, which may be considered exemplary of storage node 200, may be run (e.g., on a VM or as a containerized instance, as the case may be) within a cloud (e.g., a public cloud provided by a public cloud provider (e.g., hyperscaler 320)). In the context of the present example, the virtual storage system 310a makes use of cloud disks (e.g., hyperscale disks 325) provided by the hyperscaler for persistent storage. Non-limiting examples of hyperscale disks 325 include storage volumes provided by Amazon Web Services (AWS) Elastic Block Store (EBS), Google Cloud Platform (GCP) persistent disks (PDs), and Microsoft Azure managed disks (MDs).

The virtual storage system 310a may present file system volumes over a network to clients 305 using various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 105 may request services of the virtual storage system 310 by issuing Input/Output requests 306 (e.g., file system protocol messages (in the form of packets) over the network). A representative client of clients 305 may comprise a workload or an application, such as a database application, executing on a computer that "connects" to the virtual storage system 510 over a computer network, such as a point-to-point link, a shared local area network (LAN), a wide area network (WAN), or a virtual private network (VPN) implemented over a public network, such as the Internet.

In the context of the present example, the virtual storage system 310a is shown including a number of layers, including a file system layer 311 and one or more intermediate storage layers (e.g., a RAID layer 313 and a storage layer 315). These layers may represent components of data management software (not shown) of the virtual storage system 310. The file system layer 311 (which may be analogous to file system layer 220) generally defines the basic interfaces and data structures in support of file system operations (e.g., initialization, mounting and unmounting of volumes, creating files, creating directories, opening files, writing to files, and reading from files). A non-limiting example of the file system layer 311 is the Write Anywhere File Layout (WAFL) Copy-on-Write file system (which represents a component or layer of ONTAP software available from NetApp, Inc. of San Jose, CA).

The RAID layer 313 (which may be analogous to RAID layer 130) may be responsible for encapsulating data storage virtualization technology for combining multiple storage devices (e.g., disks) into RAID groups, for example, for purposes of data redundancy, performance improvement, or both. Depending upon the particular implementation, the RAID layer 313 may be integrated within or otherwise include a portion of the functionality enabled by the file system layer 311.

The storage layer 315 (which may be analogous to storage layer 240) may provide efficiency features, replication, fault detection, recovery functions enabling resiliency, load balancing, Quality of Service (QoS) functions, data security, and/or other functions (e.g., storage efficiency functions such as compression and deduplication). In one or more embodiments, storage layer 315 enables the storage of data in a representation that is block-based (e.g., data is stored within 4 KB blocks, and Modes are used to identify files and file attributes such as creation time, access permissions, size, and block location, etc.). Storage layer 315 may include storage drivers for interacting with the various types of hyperscale disks supported by the hyperscaler 320. In one embodiment, the storage layer 315 may be integrated within or otherwise include a portion of the functionality enabled by the file system layer 311. Depending upon the particular implementation, the file system layer 311 may persist data to the hyperscale disks 325 using one or both of the RAID layer 313 and the storage layer 315.

The various layers described herein, and the processing described below with reference to the flow diagrams of FIGS. 4 and 5 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms (e.g., servers, blades, network storage systems or appliances, and storage arrays, such as the computer system described with reference to FIG. 6 below.

Figure 4:
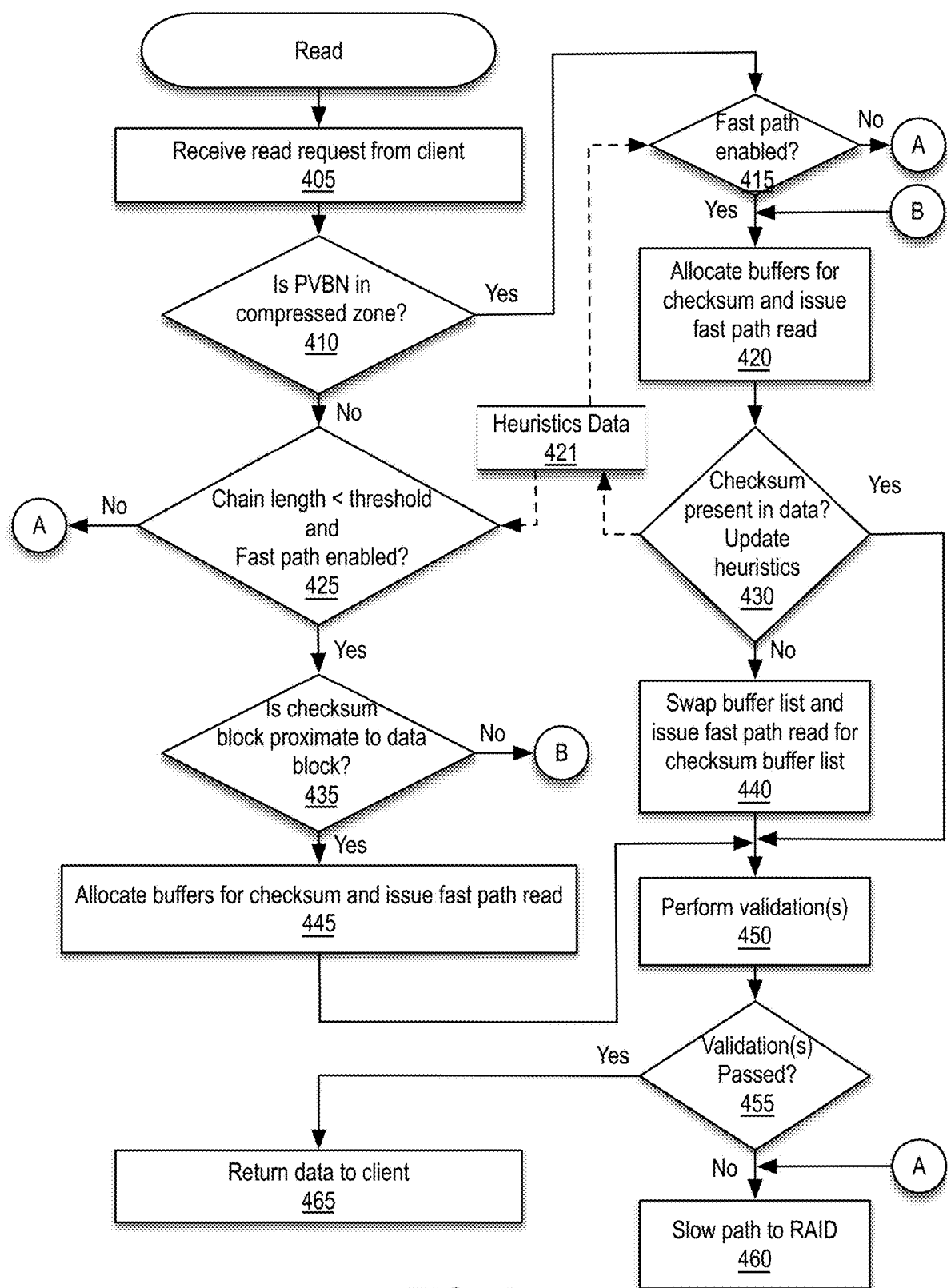
FIG. 4 is a flow diagram illustrating a set of operations for performing a read in accordance with an embodiment of the present disclosure.

FIG. 4 is a flow diagram illustrating a set of operations for performing a read in accordance with an embodiment of the present disclosure. In the context of the present example, it is assumed AZCS compression is enabled for a volume of virtual storage system (e.g., virtual storage system 310a) that is associated with a particular workload (e.g., one of clients 305). It is also assumed certain heuristic data (e.g., heuristic data 421) is maintained at a volume-level. For example, in one embodiment, a flag may be maintained within the heuristic data that is indicative of whether a fast path (e.g., fast path 211) is enabled for use. The flag may be set to indicate the fast path is enabled under certain circumstances reflecting a favorable expected performance tradeoff between directing the read request to a slow path via the RAID layer 130 verses directing the read request to the fast path. For example, when information encoded within a volume block number corresponding to the read request that identifies the volume block number as being within a compressed AZCS zone has shown to be predictive of a data block (e.g., data block 151a or 161a) specified by the volume block number actually containing both the data in compressed form and the corresponding checksum at or above a predetermined or configurable success rate during a particular window of read operations, then the flag may be set to a value that enables use of the fast path; otherwise, the flag may be set to a value that disables use of the fast path. A non-limiting example of maintaining heuristics 421 is described below with reference to FIG. 5.

At block 405, a read request (e.g., read request 110) is received from a client (e.g., one of clients 305). According to one embodiment, the read request specifies a logical block address (LBA) that maps to a volume block number (e.g., a physical volume block number (PVBN)) on a persistent storage device (e.g., one of hyperscale disks 325).

At decision block 410, a determination is made regarding whether the volume block number is in a compressed zone. If so processing branches to decision block 415; otherwise processing continues with decision block 425. In one example, temperature-sensitive storage efficiency (TSSE) is enabled for the volume of virtual storage system that is associated with the particular workload, thereby facilitating this determination based on the PVBN itself without a need to wait for the data associated with the PVBN to be read as TSSE uses a special encoding of PVBNs in which some portion of the bits of the PVBN identify whether a given PVBN is within a compressible AZCS zone (e.g., zone 150). When TSSE is enabled for a given volume, a storage efficiency mechanism may be implemented depending on an assessment by a storage layer (e.g., storage layer 240) of the "temperature" (e.g., frequency of access) of the volume data. For example, for cold data, larger data blocks may be compressed, and for hot data, which is overwritten more often, smaller data blocks may be compressed, making the process more efficient.

In one embodiment, a group of contiguous PVBNs (which may be referred to herein as a compressed data extent (CDE)) that may be used to store both compressed data and the corresponding checksum may be employed. In such an embodiment, the determination regarding whether the PVBN is in a compressed zone may simply involve comparing the PVBN to the start PVBN of the CDE range and to end PVBN of the CDE range.

At decision block 425, a determination is made regarding whether a length of a read chain of which the read request is a part is less than a predetermined or configurable chain length threshold (e.g., expressed in terms of a number of data blocks) and whether the fast path (e.g., fast path 211) is enabled. If so, processing continues with decision block 435; otherwise, processing branches to block 420.

As noted above, in one embodiment, a flag indicative of whether the fast path is enabled may be maintained within a set of heuristic data (e.g., heuristic data 421). In such an embodiment, the determination of whether the fast path is enabled may simply involve evaluation of the flag.

According to one embodiment, the normal RAID read path via the RAID layer (e.g., RAID layer 130) may be faster for reading a read request chain including 32 KB of data or more as a result of sequential reads and the implementation of a checksum cache within the RAID layer. Assuming a block size of 4 KB, the predetermined or configurable chain length threshold may be set to 8. In this manner, read request chains of 8 data blocks or more will be directed to the RAID layer regardless of whether the fast path is enabled.

At decision block 435, a determination is made regarding whether a checksum block (e.g., checksum block 165) of the AZCS zone (e.g., AZCS zone 160) is proximate to the data block. If so, read processing continues with block 445; otherwise, read processing branches to block 460. Depending upon the particular implementation a proximity threshold may be satisfied when the data block and the checksum block within a predetermined or configurable number of blocks. In one embodiment, the proximity threshold may be one block, meaning the data block and the checksum block are adjacent.

At block 445, buffers may be allocated by a file system (e.g., file system 220) for storage of the checksum and a fast path read may be issued via the fast path to retrieve both the data block (e.g., data block 161a) and the corresponding checksum from the checksum block. Responsive to completion of the fast path read for both the data block and the corresponding checksum, processing continues to block 450.

At decision block 415, it is determined whether the fast path is enabled. If so, read processing continues with block 420; otherwise, read processing branches to block 460. As noted above, in an embodiment in which a flag indicative of whether the fast path is enabled is maintained within a set of heuristic data (e.g., heuristic data 421), this determination may be made by evaluating the flag.

At block 420, the file system may allocate buffers for storage of the checksum and issue a fast path read via the fast path for the data block. In one embodiment, a buffer data structure to be populated by the fast path read may include two sets or lists of buffers, including one set or list for storing retrieved data and another set or list for storing corresponding checksums. A read pointer may by default point to the first set or list of buffers, thereby causing this first fast path read to populate the set or list of data buffers.

At decision block 430, it is determined whether the corresponding checksum is present in the data. If so, the information encoded in the volume block number indicating the data block was within an AZCS compressed zone correctly predicted the data block contained the data in compressed form as well as the corresponding checksum and read processing branches to block 450 after updating the heuristic data or causing the heuristic data to be updated as appropriate; otherwise, the information encoded in the volume block number incorrectly predicted the nature of the data block and read processing continues with block 440 after updating the heuristic data or causing the heuristic data to be updated as appropriate. Depending upon the particular implementation, the heuristic data may be updated by the read processing thread directly or caused to be updated indirectly via an abstraction that manages the heuristic data. In the case of the latter, the read process may invoke a heuristic update method exposed by the abstraction with a parameter indicative of the success or failure of the data block being stored within an AZCS compressed zone successfully correlating with the data block actually being compressed. A non-limiting example of how volume-level heuristics may be maintained is described below with reference to FIG. 5.

At block 440, the set or list of data buffers have been populated by the first fast path read performed responsive to block 420 and it has been determined at decision block 430 that the corresponding checksum was not present within the data block. Performance of this block may be considered a "retry." Assuming the double buffering mechanism described in block 420, the buffer lists/sets are swapped (e.g., the read pointer is updated to point to the set or list of checksum buffers) and a second fast path read is issued by the storage layer for the corresponding checksum. In this manner, rather than restarting the read process by directing the read request to the RAID layer, the aforementioned problem of 3× amplification is avoided, capping the latency of processing a read request when AZCS compression is enabled at the latency of two fast path reads. Responsive to completion of the second fast path read, the buffer lists/sets may again be swapped to prepare for performance of validation(s) at block 450. In one embodiment, as described further below, a retry counter may be incremented each time block 440 is performed to facilitate disabling the fast path on a permanent basis (e.g., across active I/O windows) should a maximum retry count be exceeded.

At block 450, one or more validations/verifications may be performed. In one embodiment, the validations/verifications may include validating the checksum for the data and/or the RAID context.

At decision block 455, it is determined whether all of the one or more validations/verifications performed at block 450 passed. If so, read processing branches to block 465; otherwise read processing continues with block 460.

At block 465, the data associated with the read request is returned to the client. Additionally, any buffers allocated (e.g., in block 445 or 420) may be released.

At block 460, the data and corresponding checksum is read via a slow path read issued to the RAID layer.

Figure 5:
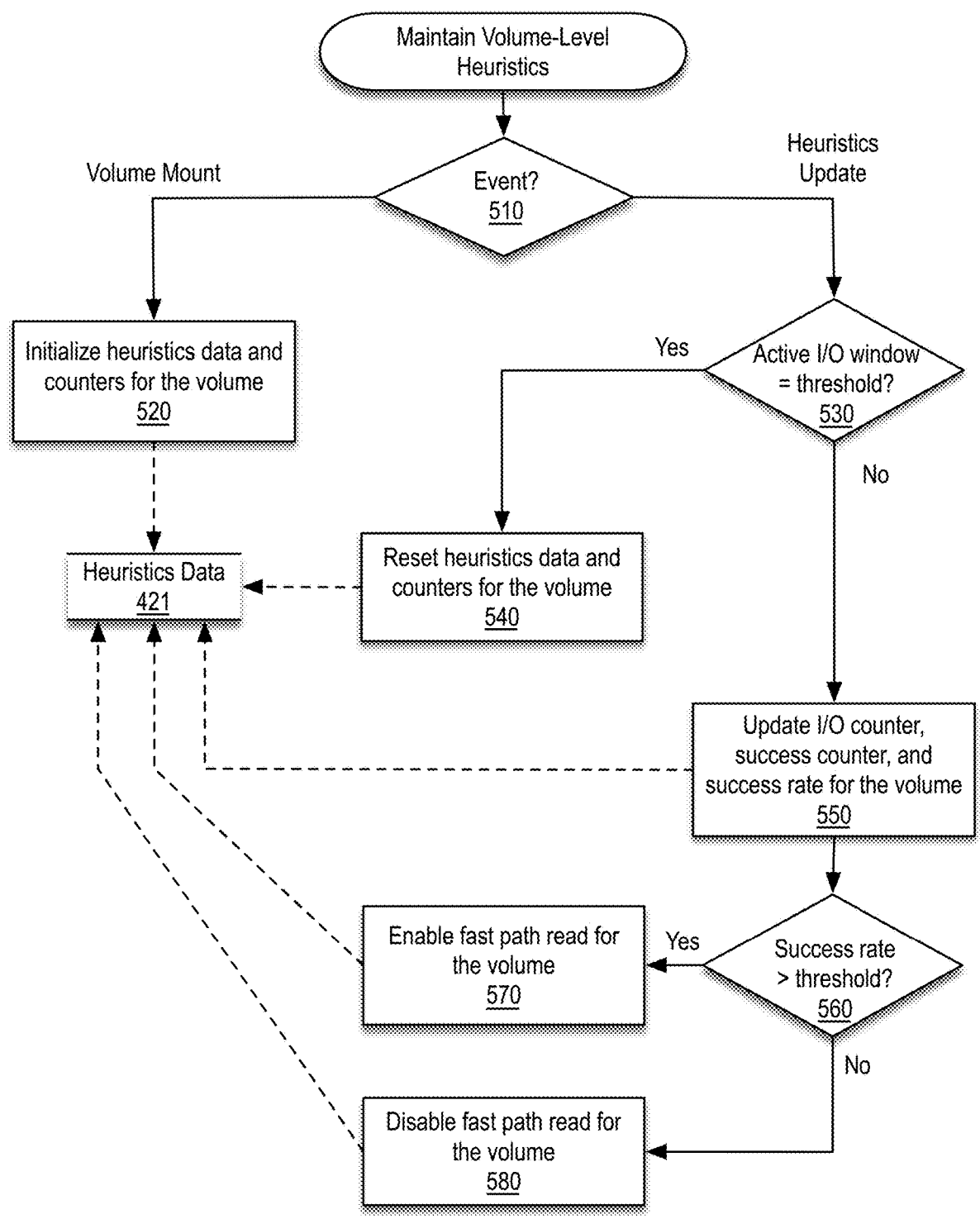
FIG. 5 is a flow diagram illustrating a set of operations for maintaining volume-level heuristics in accordance with an embodiment of the present disclosure.

FIG. 5 is a flow diagram illustrating a set of operations for maintaining volume-level heuristics in accordance with an embodiment of the present disclosure. In the context of the present example, it is assumed an abstraction (e.g., a heuristics module, routine or heuristics monitoring task) responds to and/or monitors for the occurrence of certain relevant events within a virtual storage system/appliance (e.g., virtual storage system 310*a*), including volume mount and receipt of heuristic updates. As described further below, observations within an active I/O window regarding the nature of data (e.g., compressed or not compressed) being accessed by a particular workload that makes use of a particular volume for which AZCS compression is enabled may influence how read requests from the particular workload are handled. In one embodiment, all the heuristic data and counters are maintained in-memory and are persisted only so long as the volume is mounted.

At decision block 510, a determination is made regarding the nature of the event that activated or trigged the heuristics module. When the event is a volume mount, processing continues with block 520; otherwise, when the event represents a heuristics update, processing continues with decision block 530. Depending upon the particular implementation, volume mount events may be performed in-line by intercepting or hooking such events by directly or indirectly by the heuristics module and then allowing the normal volume mount processing to continue or the occurrence of a volume mount event may raise an interrupt that is handled by the heuristic module. The heuristics update event may represent the invocation of a heuristics update method exposed by the heuristics module by a read process performed by the virtual storage system (e.g., at decision block 430 of FIG. 4).

At block 520, heuristic data and counters for the volume at issue are initialized. For example, the heuristic data and counters may include an I/O counter, a success counter, a success rate, and a fast path enabled flag. The I/O counter may measure the I/Os for an active I/O window, which may have a predetermined or configurable window size threshold. In the context of the present example, the I/O counter represents the total number of read requests involving data blocks of an AZCS compressed zone that have been processed during the active I/O window for the volume at issue. The success counter may indicate of the total number of read requests represented by the I/O counter how many were successfully predicted (e.g., by the information encoded within the PVBN) to relate to a data block storing both data in compressed form and the corresponding checksum. The success rate may represent the percentage of time during the active I/O window data blocks within a compressed AZCS zone actually contained compressed data. The success rate may be calculated by dividing the success counter by the I/O counter and multiplying by 100. The success rate and a predefined or configurable success rate threshold may in turn be used to set the fast path enabled flag as appropriate to cause a file system (e.g., file system 220) of the virtual storage system to use a fast path (e.g., fast path 211) to handle a read request (e.g., read request 110) or to use a slow path via a RAID layer (e.g., RAID layer 130).

In one embodiment, the I/O counter, the success counter, and the success rate may all be initialized to zero, and the fast path enabled flag may be initialized to true. Depending upon the particular implementation, the fast path enabled flag may be initialized based on an initial evaluation of data stored on the volume or based on the nature of the data associated with the workload utilizing the volume. For example, for a volume in which a mix of compressible and uncompressible data is stored or expected to be stored, the fast path enabled flag may be initialized to false, whereas for a volume in which all or substantially all data is stored or expected to be stored in compressed form, the fast path enabled flag may be initialized to true.

At decision block 530, a determination may be made regarding whether the active I/O window (e.g., represented by the I/O counter) has satisfied a window size threshold. If so, processing branches to block 540 to restart the active I/O window; otherwise, tracking for the active I/O window continues with block 550. In one embodiment, the window size threshold is 1,000 read requests involving data blocks within an AZCS compressed zone. Depending upon the particular implementation, the window size threshold may be established based on an initial evaluation of data stored on the volume or based on the nature of the data associated with the workload utilizing the volume. For example, for a volume in which a mix of compressible and uncompressible data is stored or expected to be stored, the window size threshold may be set to a relatively smaller value (as compared to a volume in which all or substantially all data is stored or expected to be stored in compressed form) as resetting the heuristic data and counters for such a workload is more likely to have an effect on the success rate for different phases or stages of operation of the workload.

At block 540, the heuristic data and counters for the volume at issue are reset. In one embodiment, resetting of the heuristic data and counters sets the I/O counter, the success counter, the success rate, and the fast path enabled flag to the initial values as described with reference to block 520.

At block 550, the I/O counter, success counter, and the success rate are updated for the volume at issue. In one embodiment, the I/O counter may be incremented and depending upon the nature of the heuristics update, the success counter and the success rate are updated appropriately. For example, when a data block associated with a read request that is stored within an AZCS compressed zone actually is in compressed form, meaning the location of the data block within the AZCS compressed zone successfully predicted the existence of both the compressed data and the corresponding checksum within the data block, the success counter may be incremented, whereas, when the data block is not in compressed form, meaning the location of the data block within the AZCS compressed zone unsuccessfully predicted the existence of both the compressed data and the corresponding checksum within the data block, the success counter may remain the same (and/or an unsuccessful counter may be incremented). Based on the current values of the counters, the success rate may then be recalculated.

At decision block 560, a determination is made regarding whether the success rate meets a success rate threshold. If so, processing continues with block 570 at which performance of fast path reads is enabled for the volume at issue by setting the fast path enabled flag to true; otherwise, processing continues with block 580 at which performance of fast path reads are disabled for the volume at issue by setting the fast path enabled flag to false. The success rate threshold effectively represents a selection among expected performance tradeoffs between directing received read requests (e.g., read request 110) to a slow path via the RAID layer verses directing the read requests to the fast path. In one embodiment, the success rate threshold is between approximately 70% to 80%.

While in the context of the present example, the fast path may be enabled or disabled (as appropriate) at the start of each new active I/O window, other mechanisms may be used to put a cap on the number of retries accumulated across active I/O windows so as to stop attempting to perform fast path reads, for example, when it would be inefficient to do so. For example, a retry counter may track the total number of times a read request was unsuccessfully predicted (e.g., by the information encoded within the PVBN) to relate to a data block storing both data in compressed form and the corresponding checksum, for example, resulting in performance of block 440 of FIG. 4. Such a retry counter may be persisted across heuristic data and counter resets performed at block 540 and may be compared during the read processing of FIG. 4 to a predetermined or configurable maximum retry threshold (e.g., 2,000). When the maximum retry threshold is exceeded, the fast path may be permanently disabled for the volume, for example, until the retry counter has been manually reset by an administrative user.

While in the context of the examples described with reference to FIG. 4 and FIG. 5, a number of enumerated blocks are included, it is to be understood that other examples may include additional blocks before, after, and/or in between the enumerated blocks. Similarly, in some examples, one or more of the enumerated blocks may be omitted and/or performed in a different order.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 6:
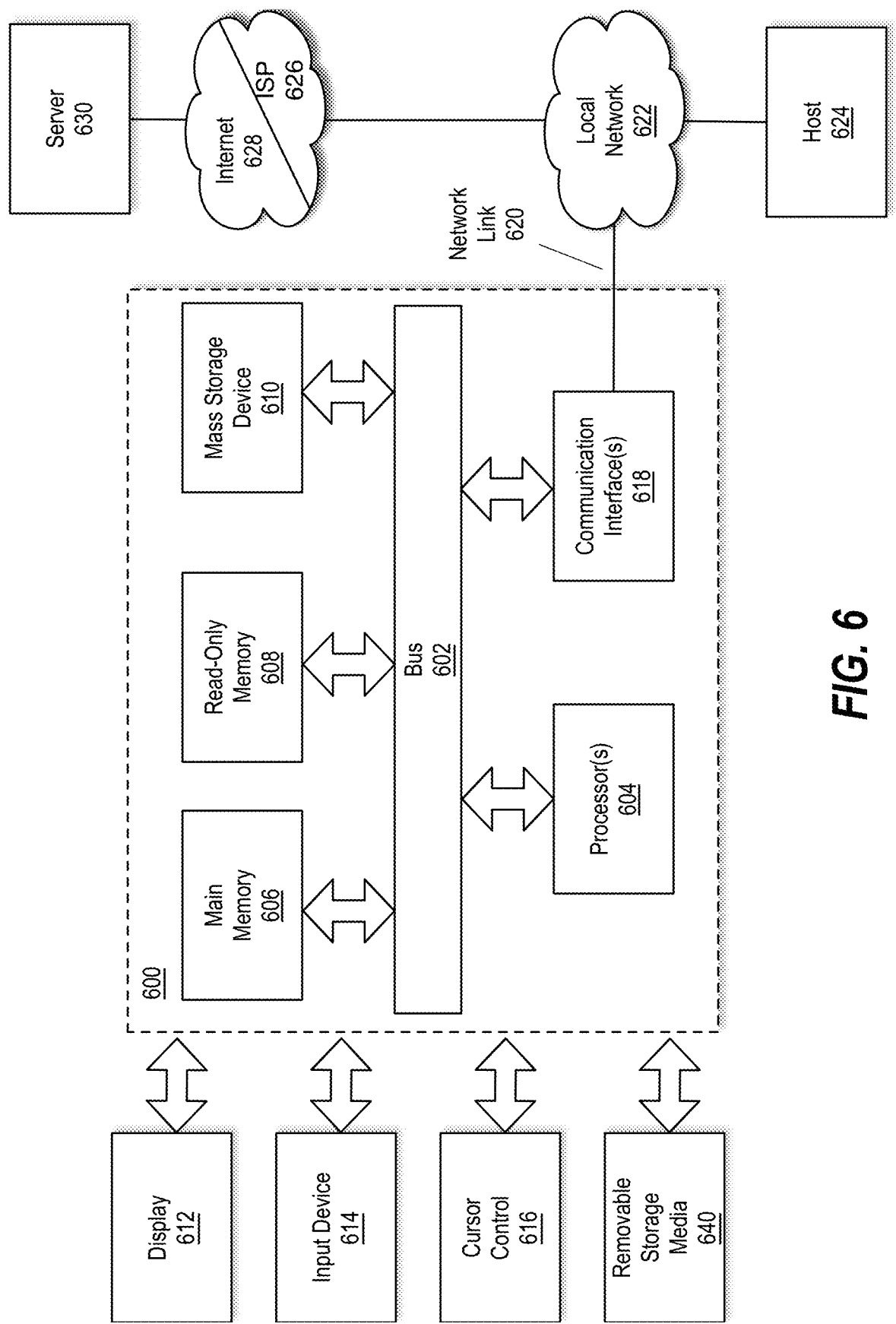
FIG. 6 illustrates an example computer system in which or with which embodiments of the present disclosure may be utilized.

FIG. 6 is a block diagram that illustrates a computer system 600 in which or with which an embodiment of the present disclosure may be implemented. Computer system 600 may be representative of all or a portion of the computing resources associated with a virtual storage system (e.g., virtual storage system 110). Notably, components of computer system 600 described herein are meant only to exemplify various possibilities. In no way should example computer system 600 limit the scope of the present disclosure. In the context of the present example, computer system 600 includes a bus 602 or other communication mechanism for communicating information, and a processing resource (e.g., a hardware processor 604) coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, e.g., a magnetic disk, optical disk or flash disk (made of flash memory chips), is provided and coupled to bus 602 for storing information and instructions.

Computer system 600 may be coupled via bus 602 to a display 612, e.g., a cathode ray tube (CRT), Liquid Crystal Display (LCD), Organic Light-Emitting Diode Display (OLED), Digital Light Processing Display (DLP) or the like, for displaying information to a computer user. An input device 614, including alphanumeric and other keys, is coupled to bus 602 for communicating information and command selections to processor 604. Another type of user input device is cursor control 616, such as a mouse, a trackball, a trackpad, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Removable storage media 640 can be any kind of external storage media, including, but not limited to, hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM), USB flash drives and the like.

Computer system 600 may implement the techniques described herein using customized hard-wired logic, one or more ASICs or FPGAs, firmware or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 610. Volatile media includes dynamic memory, such as main memory 606. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, or stored in storage device 610, or other non-volatile storage for later execution.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A virtual storage system comprising:
one or more processing resources; and
a non-transitory computer-readable medium, coupled to the one or more processing resources, having stored therein instructions that when executed by the one or more processing resources cause the virtual storage system to:
maintain, by a file system of the virtual storage system, volume-level heuristic data for a volume of the virtual storage system indicative of a correlation between (i) a plurality of data blocks stored on the volume of the virtual storage system being located within a compressible zone of a zoned checksum scheme and (ii) respective data blocks of the plurality of data blocks containing compressed data and a corresponding checksum, wherein the correlation predicts odds of data within the respective data blocks being stored in compressed form; and
reduce read amplification, in which a number of read operations generated by a read request in the virtual storage system is reduced, by selectively directing, by the file system, the read request associated with a data block of the plurality of data blocks to a fast path via a storage layer of the virtual storage system based on the correlation predicting the odds that indicate data stored in the data block is in compressed form or a slow path via a data virtualization layer of the virtual storage system based on the correlation predicting the odds that indicate the data stored in the data block is not in compressed form, wherein the read request is received by the file system from a workload to which the volume has been assigned for use.

2. The virtual storage system of claim 1, wherein the zoned checksum scheme comprises advanced zone checksum (AZCS).

3. The virtual storage system of claim 1, wherein the volume-level heuristic data is maintained in-memory and wherein maintenance of the volume-level heuristic data commences for the volume responsive to the volume being mounted.

4. The virtual storage system of claim 1, wherein the volume-level heuristic data includes:
a read counter indicative of a total number of read requests received by the file system involving data blocks of the compressible zone during an active window of read requests;
a success counter indicative of a subset of the total number of read requests for which the correlation was successfully predicted;
a success rate calculated based on the read counter and the success counter; and
a fast path enabled flag set based on the success rate satisfying a success rate threshold.

5. The virtual storage system of claim 4, wherein the instructions further cause the virtual storage system to, responsive to the read counter satisfying a threshold, reset the volume-level heuristic data.

6. The virtual storage system of claim 1, wherein the instructions further cause the virtual storage system to, responsive to completion of a read operation for the data block via the fast path, update the volume-level heuristic data.

7. The virtual storage system of claim 1, wherein the volume-level heuristic data further includes a retry counter indicative of a number of times data blocks retrieved by fast path reads do not contain a checksum for the data contained within the data block and wherein the instructions further cause the virtual storage system to, responsive to the retry counter satisfying a maximum retry threshold, disable the fast path for subsequent read requests for the volume.

8. A method comprising:
maintaining, by a file system of a virtual storage system, volume-level heuristic data for a volume of the virtual storage system indicative of a correlation between (i) a plurality of data blocks stored on the volume of the virtual storage system being located within a compressible zone of a zoned checksum scheme and (ii) respective data blocks of the plurality of data blocks containing compressed data and a corresponding checksum, wherein the correlation predicts odds of data within the respective data blocks being stored in compressed form; and
reducing read amplification, in which a number of read operations generated by a read request in the virtual storage system is reduced, by selectively directing, by the file system, the read request associated with a data block of the plurality of data blocks to a fast path via a storage layer of the virtual storage system based on the correlation predicting the odds that indicate data stored in the data block is in compressed form or a slow path via a data virtualization layer of the virtual storage system based on the correlation predicting the odds that indicate the data stored in the data block is not in compressed form, wherein the read request is received by the file system from a workload to which the volume has been assigned for use.

9. The method of claim 8, wherein the zoned checksum scheme comprises advanced zone checksum (AZCS).

10. The method of claim 8, wherein the volume-level heuristic data is maintained in-memory, and wherein said maintaining commences for the volume responsive to the volume being mounted.

11. The method of claim 8, wherein the volume-level heuristic data includes:
a read counter indicative of a total number of read requests received by the file system involving data blocks of the compressible zone during an active window of read requests;
a success counter indicative of a subset of the total number of read requests for which the correlation was successfully predicted;
a success rate calculated based on the read counter and the success counter; and
a fast path enabled flag set based on the success rate satisfying a success rate threshold.

12. The method of claim 8, further comprising responsive to completion of a read operation for the data block via the fast path, updating the volume-level heuristic data.

13. A non-transitory machine readable medium storing instructions, which when executed by one or more processing resources of a virtual storage system, cause the virtual storage system to:
maintain, by a file system of the virtual storage system, volume-level heuristic data for a volume of the virtual storage system indicative of a correlation between (i) a plurality of data blocks stored on the volume of the virtual storage system being located within a compressible zone of a zoned checksum scheme and (ii) respective data blocks of the plurality of data blocks containing compressed data and a corresponding checksum, wherein the correlation predicts odds of data within the respective data blocks being stored in compressed form; and reduce read amplification, in which a number of read operations generated by a read request in the virtual storage system is reduced, by selectively directing, by the file system, the read request associated with a data block of the plurality of data blocks to a fast path via a storage layer of the virtual storage system based on the correlation predicting the odds that indicate data stored in the data block is in compressed form or a slow path via a data virtualization layer of the virtual storage system based on the correlation predicting the odds that indicate the data stored in the data block is not in compressed form, wherein the read request is received by the file system from a workload to which the volume has been assigned for use.

14. The non-transitory machine readable medium of claim 13, wherein the zoned checksum scheme comprises advanced zone checksum (AZCS).

15. The non-transitory machine readable medium of claim 13, wherein the volume-level heuristic data is maintained in-memory and wherein maintenance of the volume-level heuristic data commences for the volume responsive to the volume being mounted.

16. The non-transitory machine readable medium of claim 13, wherein the volume-level heuristic data includes:
 a read counter indicative of a total number of read requests received by the file system involving data blocks of the compressible zone during an active window of read requests;
 a success counter indicative of a subset of the total number of read requests for which the correlation was successfully predicted;
 a success rate calculated based on the read counter and the success counter; and
 a fast path enabled flag set based on the success rate satisfying a success rate threshold.

17. The non-transitory machine readable medium of claim 16, wherein the instructions further cause the virtual storage system to responsive to the read counter satisfying a threshold, reset the volume-level heuristic data.

18. The non-transitory machine readable medium of claim 13, wherein the instructions further cause the virtual storage system to responsive to completion of a read operation for the data block via the fast path, update the volume-level heuristic data.

19. The non-transitory machine readable medium of claim 13, wherein the volume-level heuristic data further includes a retry counter indicative of a number of times data blocks retrieved by fast path reads do not contain a checksum for the data contained within the data block and wherein the instructions further cause the virtual storage system to, responsive to the retry counter satisfying a maximum retry threshold, disabling the fast path for subsequent read requests for the volume.

20. The method of claim 11, wherein the volume-level heuristic data further includes a retry counter indicative of a number of times data blocks retrieved by fast path reads do not contain a checksum for the data contained within the data block and wherein the method further comprises:
 responsive to the retry counter satisfying a maximum retry threshold, disabling the fast path for subsequent read requests for the volume; and
 responsive to the read counter satisfying a threshold, resetting the volume-level heuristic data.

* * * * *